United States Patent
Surridge et al.

(10) Patent No.: US 7,765,779 B2
(45) Date of Patent: Aug. 3, 2010

(54) LATCH MECHANISM FOR RETAINING GRASS CATCHER ON REEL MOWER CUTTING UNIT

(75) Inventors: David G. Surridge, Raleigh, NC (US); Ronald L. Reichen, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/193,474

(22) Filed: Aug. 18, 2008

(65) Prior Publication Data

US 2010/0037581 A1    Feb. 18, 2010

(51) Int. Cl.
*A01H 5/00* (2006.01)
(52) U.S. Cl. .............. 56/5; 56/198; 56/199; 16/258
(58) Field of Classification Search .............. 56/5, 56/194, 198–200, 202–204; 16/257, 258, 16/262, 266; 403/318, 319
See application file for complete search history.

(56) References Cited

U.S. PATENT DOCUMENTS

| | | |
|---|---|---|
| 930,058 A | 8/1909 | Ertl |
| 939,068 A | 11/1909 | McGrath |
| 1,484,084 A | 2/1924 | Rohrbach |
| 1,999,102 A | 4/1935 | Kirby |
| 2,124,835 A | 7/1938 | Strutz |
| 2,440,934 A | 5/1948 | De Vol |
| 2,475,671 A | 7/1949 | McCartney |
| 2,568,045 A | 9/1951 | Weisert |
| 2,579,103 A | 12/1951 | Whittaker |
| 2,932,146 A | 4/1960 | Campbell |
| 3,023,451 A * | 3/1962 | Thoel ............ 16/258 |
| 3,110,147 A * | 11/1963 | Barth ............ 56/199 |
| 3,129,550 A | 4/1964 | Waag |
| 3,197,949 A | 8/1965 | Waag |
| 3,378,297 A | 4/1968 | Temes et al. |
| 3,383,132 A | 5/1968 | Stamp |
| 3,408,801 A | 11/1968 | Kroll |
| 3,423,916 A * | 1/1969 | Teal ............ 56/199 |
| 3,513,649 A | 5/1970 | Berg |
| 3,517,493 A | 6/1970 | Kiteley |
| 3,553,947 A | 1/1971 | Root |
| 3,584,351 A | 6/1971 | Sliwinski |
| 3,597,786 A | 8/1971 | Ruhl |
| 3,624,699 A | 11/1971 | Hoffmann |
| 3,820,312 A | 6/1974 | Robinson |
| 3,875,729 A | 4/1975 | Partsch |
| 4,179,860 A | 12/1979 | Reale |
| 4,239,278 A | 12/1980 | Skilliter, Jr. |

(Continued)

OTHER PUBLICATIONS

John Deere, 2500 Professional Greensmower, Operator's Manual, Copyright 1998, 22 pages, Horicon, WI, USA.

(Continued)

*Primary Examiner*—Alicia M Torres

(57) ABSTRACT

A latch mechanism is disclosed that retains a grass catcher on a reel mower cutting unit. The latch mechanism includes a latch plate releasably holding a rod end of the grass catcher in a slot on the reel mower cutting unit. The latch plate pivots on a horizontal axis. A clip is fastened to the horizontal axis to lock the latch plate in either a locked position retaining the grass catcher or an unlocked position allowing removal of the grass catcher.

11 Claims, 3 Drawing Sheets

U.S. PATENT DOCUMENTS

| | | |
|---|---|---|
| 4,648,238 A | 3/1987 | Greider et al. |
| 4,738,088 A | 4/1988 | Klever et al. |
| 4,747,258 A * | 5/1988 | Martinez ............... 56/199 |
| 4,774,802 A | 10/1988 | Azbell |
| 4,858,861 A | 8/1989 | Wilkinson, III |
| 4,924,663 A | 5/1990 | Ehn, Jr. et al. |
| 4,936,083 A | 6/1990 | Deutsch |
| 4,970,852 A | 11/1990 | Check et al. |
| 5,228,277 A | 7/1993 | Smith et al. |
| 5,412,931 A | 5/1995 | Reichen et al. |
| 5,533,326 A | 7/1996 | Goman et al. |
| 6,237,313 B1 | 5/2001 | Leden |
| 6,341,478 B1 | 1/2002 | Sallstrom et al. |
| 6,487,837 B1 | 12/2002 | Fillman et al. |
| 6,595,737 B1 | 7/2003 | Parish |
| 6,622,464 B2 | 9/2003 | Goman et al. |
| 6,637,081 B1 | 10/2003 | Kulkaski |
| 6,802,175 B2 | 10/2004 | Fillman et al. |
| 6,941,791 B1 * | 9/2005 | Sanders et al. ............... 72/458 |
| 7,191,584 B2 | 3/2007 | Goman et al. |
| 7,310,930 B2 | 12/2007 | Percy et al. |
| 2002/0095922 A1 | 7/2002 | Goman et al. |
| 2005/0120697 A1 | 6/2005 | Percy et al. |
| 2006/0123761 A1 | 6/2006 | Goman et al. |
| 2006/0168929 A1 | 8/2006 | Phillips |

OTHER PUBLICATIONS

John Deere, 2500 Professional Greensmower, Parts Catalog, Jan. 1999, 17 pages, USA.

* cited by examiner

LATCH MECHANISM FOR RETAINING GRASS CATCHER ON REEL MOWER CUTTING UNIT

FIELD OF THE INVENTION

This invention relates generally to grass mowing equipment, and more specifically to retaining a grass catcher to a reel mower cutting unit.

BACKGROUND OF THE INVENTION

In the past, various mounting devices have been used to attach a grass catcher to a reel mower cutting unit. Typically, a grass catcher may be mounted directly in front of a reel mower cutting unit to collect grass clippings discharged from the cutting unit as it moves forward in the mowing position.

Grass mowing machines such as fairway mowers, trim mowers and triplex riding greensmowers may have reel mower cutting units that can pivot on one or more axes of rotation. For example, each reel mower cutting unit may be mounted to a lift arm extending from a traction unit so that the cutting unit can pitch on a horizontal axis parallel to the reel, roll on a horizontal axis in the direction of travel, and/or yaw or steer on a vertical axis. The pivoting action allows the cutting unit to better follow the ground surface, avoid scalping, and provide a more uniform height of cut.

While a reel mower cutting unit pivots, it is important that the grass catcher remain close enough to the cutting unit so that grass clippings do not fall into a gap between the cutting unit and grass catcher. To accomplish this, some grass catcher mounting devices have been designed to allow the grass catcher to pivot and move along with the reel mower cutting unit. Additionally, some grass catchers are mounted to a separate frame or to the grass mowing machine traction unit so that the reel mower cutting unit itself does not support the weight of the grass catcher.

For example, U.S. Pat. Nos. 5,533,326 and 6,341,478 relate to a triplex greensmower having a grass catcher mounted on a carrier frame in front of each reel mower cutting unit, with a pair of horns supporting the ends of the grass catcher. The '478 patent also relates to a pivot axis connection that is located forwardly and above the cutting unit so the grass catcher can yaw or steer.

Other grass mowing machines have mounting devices in which the reel mower cutting unit substantially supports the grass catcher. These machines include walk behind greensmowers in which the cutting unit helps support the frame or traction unit in the mowing position. Additionally, fairway mowers may have reel mower cutting units that substantially support the weight of both the lift arm and the grass catcher attached to the lift arm.

A grass catcher mounting device offered by Deere & Company on riding greensmowers includes a hook extending forwardly from the traction unit frame, which may be connected to a handle on a bail under the grass catcher. The bail is pivotably mounted to the reel mower cutting unit, allowing the grass catcher to pitch on a horizontal axis with respect to the reel. The handle slides on the hook as the grass catcher yaws or steers with the cutting unit. To install, the grass catcher is positioned on the bail, then the hook is fastened or latched to the handle. To remove the grass catcher, the two actions are reversed.

U.S. Pat. No. 5,412,931 relates to a slidable grass catcher with a laterally extending rail on the cutting unit, and a pair of hooks on the grass catcher that engage the rail. U.S. Pat. No. 6,237,313 relates to a grass catcher support assembly that includes upper and lower support members at each side of the cutting unit that support the grass catcher, with cables attached between the upper and lower support members.

Some grass mowing machines have lift arms that are used to raise the reel cutting units from a mowing mode to a transport mode. As it is being lifted, the cutting reel axis moves from a horizontal alignment to a vertical alignment. However, the grass catcher may fall off the cutting unit as the cutting reel is raised to the transport mode, or as the grass mowing machine travels while the cutting units are in the transport mode. Additionally, the grass catcher may move or shift from its correct mounting position as the cutting unit moves. In either case, the operator must stop the traction unit and get off the machine to re-hang the grass catcher.

Thus, it is desirable to secure a grass catcher to a reel mower cutting unit so that it will not fall off the cutting unit or shift from its proper mounting position, especially while in the transport mode. Additionally, it is desirable to secure a grass catcher to a reel mower cutting unit in a manner that is simple for an operator to lock or release. There is a need for a grass catcher securing device that is less complex and costly than existing devices.

SUMMARY OF THE INVENTION

A latch mechanism is provided for retaining a grass catcher on a reel mower cutting unit. The latch mechanism includes a latch plate that can pivot between a locked position over a portion of a slot where the side panel of the grass catcher is positioned, and an unlocked position adjacent the slot. A clip is engaged to the latch plate and is movable between a first position holding the latch plate in the locked position and a second position holding the latch plate in the unlocked position.

The latch device secures the grass catcher to a reel mower cutting unit so that it will not fall off the cutting unit or shift from its proper mounting position. The latch mechanism is simple and inexpensive, and an operator can use it to lock or release the grass catcher from the reel cutting unit.

DESCRIPTION OF THE PREFERRED EMBODIMENT

Figure 1:
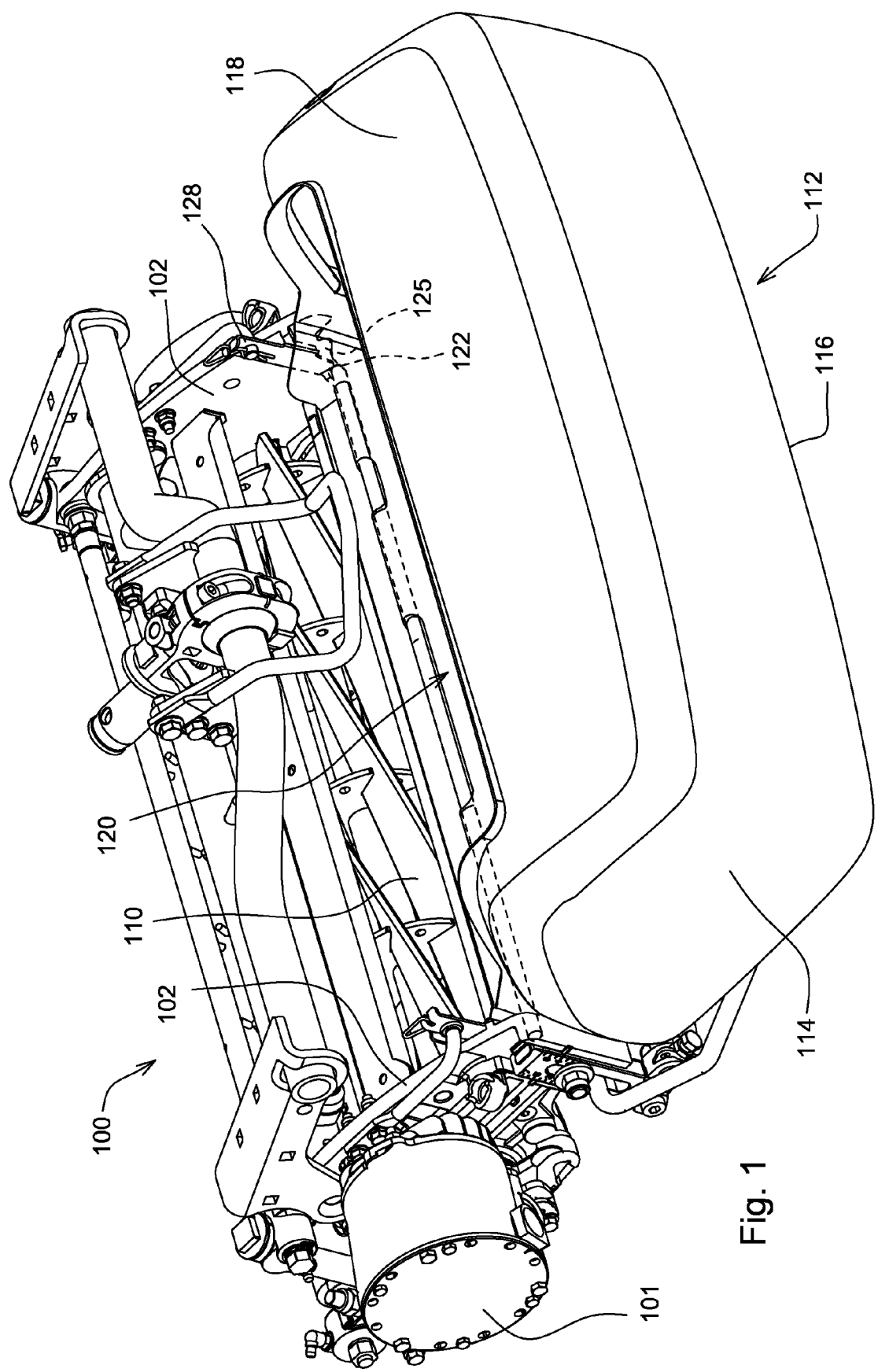
FIG. 1 is a perspective view of a reel mower cutting unit with a latch mechanism retaining a grass catcher according to a preferred embodiment of the invention.
Figure 2:
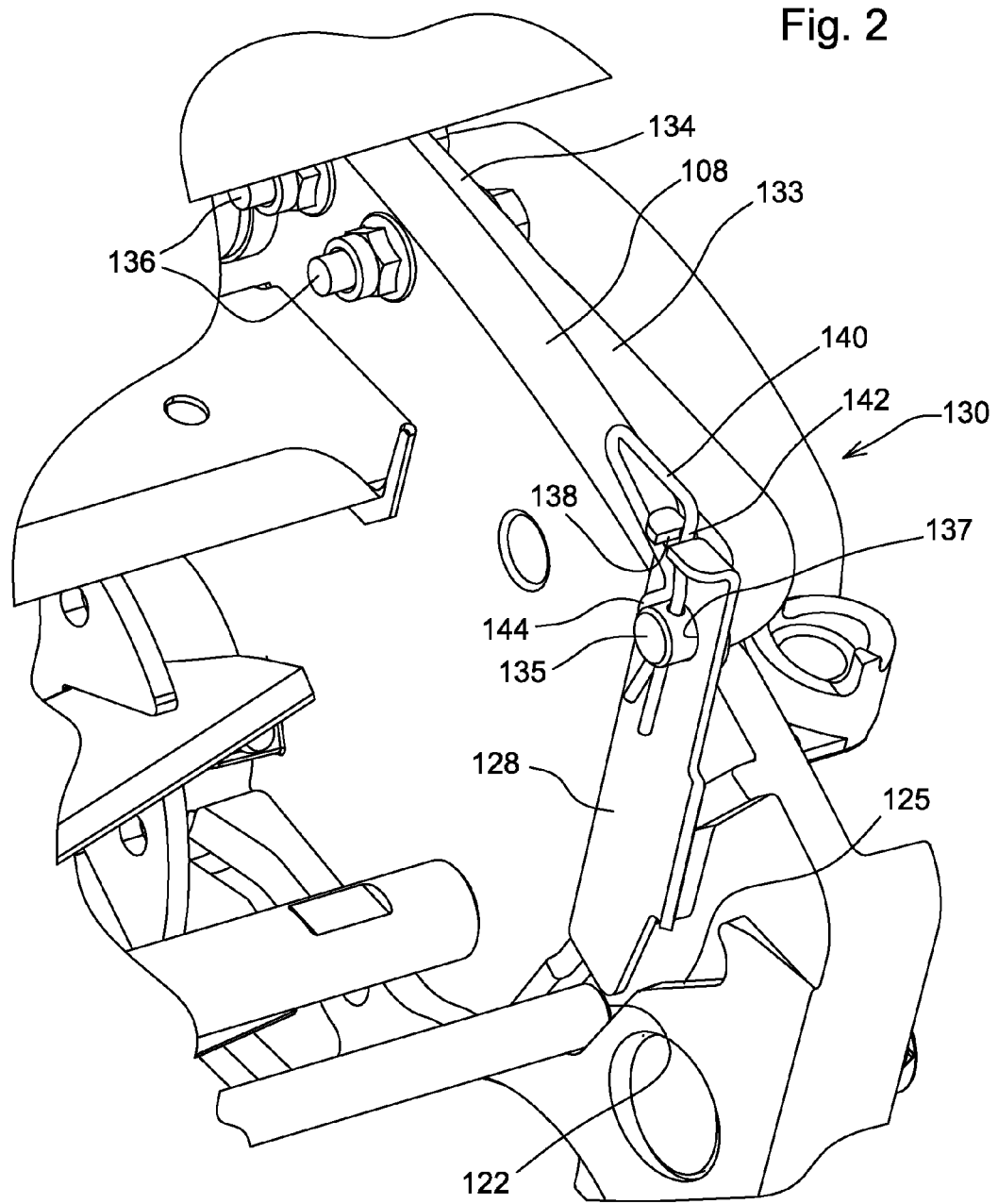
FIG. 2 is a perspective view of a latch mechanism retaining a grass catcher in a locked position according to a preferred embodiment of the invention.
Figure 3:
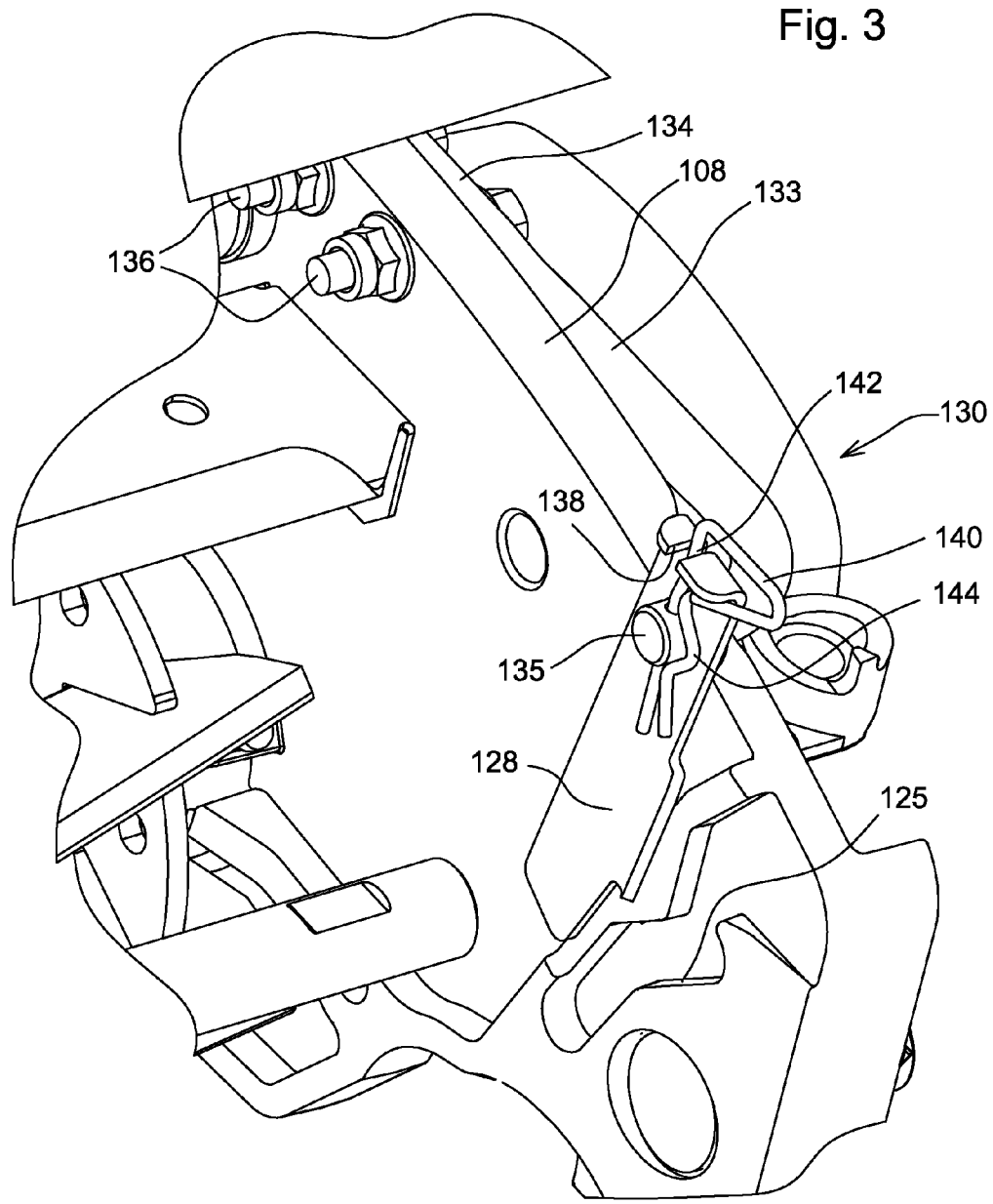
FIG. 3 is a perspective view of the latch mechanism in an unlocked position according to a preferred embodiment of the invention.

In one embodiment, reel mower cutting unit 100 may be rotated by electric motor 101 mounted to one of side panels 102 on the left and right sides of the cutting unit. Alternatively, the reel mower cutting unit may be driven directly or indirectly by the engine through a mechanical or hydrostatic transmission. The reel mower cutting unit rotates about a generally horizontal and laterally extending axis, and is carried by front and rear rollers coupled to the side panels and contacting the ground during mowing operations. Grass may be cut between rotating reel blades of cutting reel 110 and a bedknife mounted between the side panels. The front and rear rollers may be adjusted up or down to change the cutting height. While the reel mower cutting unit is on the ground in the mowing position, the cutting unit helps support the frame. The reel mower cutting unit may be pivotably connected to a forward extending portion of a lift arm that is pivotably connected to the frame of a triplex riding greensmower, fairway mower or trim mower. A yoke may pull the cutting unit during mowing operations, allowing the cutting unit to follow the contours of the ground surface and cut grass at a specified height.

In one embodiment, grass catcher 112 may be positioned directly in front of reel mower cutting unit 100. Grass catcher 112 may have opposing sides 114, lower wall or panel 116, and upper wall or panel 118. Opening 120 may face the reel mower cutting unit to receive grass clippings discharged by the cutting unit. The lower wall or panel may extend over the front roller of the cutting unit. The reel mower cutting unit may be mounted to a traction unit of a grass mowing machine with a lift arm that may be hydraulically or electrically actuated to raise the cutting unit from a mowing position to a transport position. The reel mower cutting unit includes a horizontally aligned cutting reel that interacts with a bedknife to cut grass with a scissoring action.

In one embodiment, grass catcher 112 is mounted to the cutting unit by inserting a pair of rod ends 122 into a pair of slots 125 in the opposing side panels of the cutting unit frame. The rod ends 122 may extend laterally from each side panel of the grass catcher.

In one embodiment, each latch mechanism 130 retains a rod end 122 in slot 125 so that the grass catcher does not become unattached from the cutting unit, especially while moving the cutting unit to the transport mode or travelling in the transport mode. Preferably, a latch mechanism is provided on each side of the reel mower cutting unit, so that rod ends on both sides of the grass catcher may be retained in slots on the reel mower cutting unit. Each latch mechanism includes a latch plate 128 that can pivot or slide over slot 125 to capture and retain the rod end 122 in the slot. The latch plate also can pivot to an unlocked position adjacent the slot, allowing the rod end to move out of the slot.

In one embodiment, each latch plate 128 is pivotably mounted on a horizontal pivot axis. Preferably, the horizontal pivot axis may be provided by latch pivot rod 133. Each latch pivot rod 133 has a first end 134 mounted to side panel 108 of the cutting unit, and a second end 135 pivotably connected to latch plate 128. The first end 134 of latch pivot rod 133 may be fastened to side panel 108 with threaded fasteners 136. The second end 135 of latch pivot rod 133 may be at a ninety degree angle and pivotably fastened to latch plate 128. For example, the second end 135 may be inserted through hole 137 in the latch plate, allowing the latch plate to pivot on a horizontal axis provided by latch pivot rod 133.

In one embodiment, the upper portion of latch plate 128 is provided with a slot 138 that is engaged by clip 140. Clip 140 retains the latch plate on the end of latch pivot rod 133 which provides a pivot axis for the latch plate. Additionally, when the operator pivots clip 140 by 180 degrees, a first bend 142 in the clip, which is in slot 138, moves or cams the latch plate from a closed or locked position to an open or unlocked position. By pivoting clip 140 back 180 degrees moves or cams the latch plate back to the closed or locked position. Additionally, clip 140 has a second bend 144 that fits onto the second end of the rod so that the clip provides a detent action holding the latch plate in place, and also preventing the latch plate from moving from a closed position to an open position.

In one embodiment, an operator can quickly and easily pivot the clips on each side of the grass catcher to open and close the latch mechanism as necessary. For example, operators may prefer that the latch mechanisms are in the closed position while transporting the grass mowing machine to the golf course or other area to be mowed. The operator may pivot the clips to release or unlock the latch mechanisms to allow removal of the grass catcher for emptying, and leave the latch mechanisms open after re-mounting the grass catchers and continuing to mow. The operator may then pivot the clips to close the latch mechanisms before transporting the machine to another area to be cut.

Although the latch mechanism for retaining a grass catcher is described and shown on a reel cutting unit of a fairway mower, it will be understood by those skilled in the art that the latch mechanism also may be used on any other grass mowing machine having one or more reel mower cutting units. For example, the latch mechanism may be used for reel mower cutting units on triplex riding greensmowers, trim mowers, or walk behind greensmowers.

Having described a preferred embodiment, it will become apparent that various modifications can be made without departing from the scope of the invention as defined in the accompanying claims.

The invention claimed is:

1. A latch mechanism retaining a grass catcher on a reel mower cutting unit, comprising:
   a latch plate pivotable on a latch pivot rod having a first axis between a locked position over a portion of a slot on a side panel of the reel mower cutting unit where the grass catcher is positionable, and an unlocked position adjacent the slot; and
   a clip retaining the latch plate on the latch pivot rod and pivoting on a second axis perpendicular to the first axis to cam a surface of the latch plate to move the latch plate between the locked position and the unlocked position.

2. The latch mechanism of claim 1 wherein the latch pivot rod is secured to the side panel of the reel mower cutting unit.

3. The latch mechanism of claim 1 further comprising a latch plate on each side of the reel mower cutting unit.

4. A latch mechanism retaining a grass catcher on a reel mower cutting unit, comprising:
   a latch plate pivotable on a latch pivot rod having a horizontal axis between a locked position holding a rod end extending from the grass catcher to the reel mower cutting unit, and an unlocked position allowing disengagement of the rod end from the reel mower cutting unit; and
   a clip retaining the latch plate on the latch pivot rod and pivotable on a vertical axis to cam a surface of the latch plate to move the latch plate between the locked and unlocked positions.

5. The latch mechanism of claim 4 wherein the latch plate in the locked position releasably locks the rod end in a slot in the side of the reel mower cutting unit.

6. The latch mechanism of claim 4 wherein the latch pivot rod is mounted to the side of the reel mower cutting unit.

7. The latch mechanism of claim 6 wherein the clip engages the latch pivot rod and the latch plate.

8. The latch mechanism of claim 4 further comprising a pair of latch plates, each latch plate holding a rod end extending from each side of the grass catcher to the reel mower cutting unit.

9. A latch mechanism retaining a grass catcher on a reel mower cutting unit, comprising:
   a latch plate releasably holding a rod end of the grass catcher in a slot on the reel mower cutting unit; the latch plate pivotable on a latch pivot rod having a horizontal axis; and
   a clip inserted through a hole in the latch pivot rod and pivotable on the axis defined by the hole to cam a surface of the latch plate to move the latch plate between a locked position holding the rod end of the grass catcher in the slot and an unlocked position allowing removal of the rod end of the grass catcher from the slot.

10. The latch mechanism of claim 9 wherein the latch pivot rod has a first end fastened to the reel mower cutting unit and a second end having the horizontal pivot axis.

11. The latch mechanism of claim 9 wherein the slot is in a side panel of the reel mower cutting unit.

* * * * *